No. 717,526. PATENTED JAN. 6, 1903.
J. E. BARNEY.
VALVE PLIERS.
APPLICATION FILED MAR. 19, 1902.
NO MODEL.
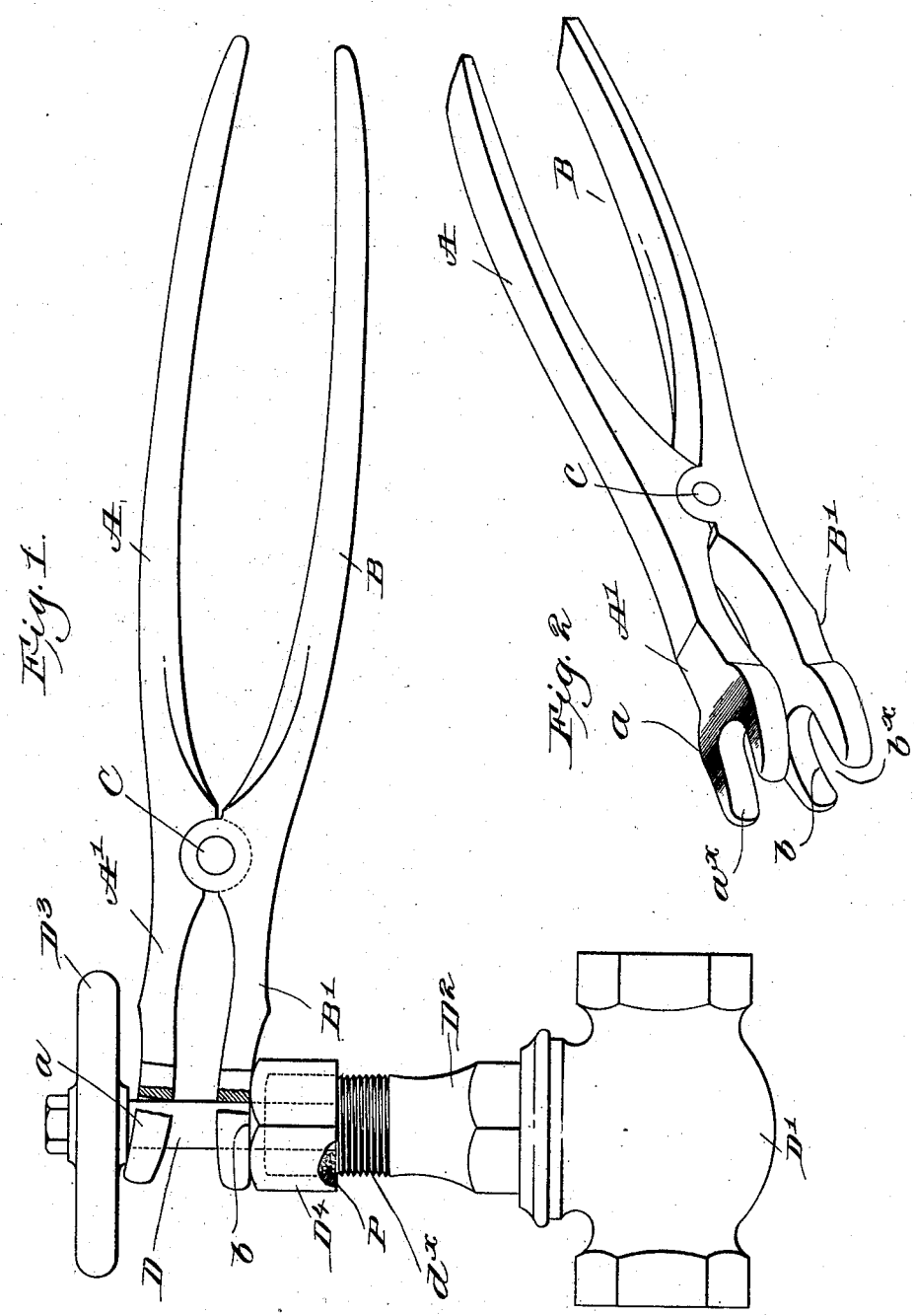
Witnesses.
Claude W. Lunsford
Herman J. Sartoris
Inventor.
James E. Barney.
by Crosby Gregory
Atty's.

UNITED STATES PATENT OFFICE.

JAMES E. BARNEY, OF BOSTON, MASSACHUSETTS.

VALVE-PLIERS.

SPECIFICATION forming part of Letters Patent No. 717,526, dated January 6, 1903.

Application filed March 19, 1902. Serial No. 98,891. (No model.)

*To all whom it may concern:*

Be it known that I, JAMES E. BARNEY, a citizen of the United States, residing at Boston, in the county of Suffolk and State of Massachusetts, have invented an Improvement in Valve-Pliers, of which the following description, in connection with the accompanying drawings, is a specification, like letters on the drawings representing like parts.

This invention has for its object the production of novel pliers for use in restuffing or packing valves, whereby the packing-nut can be accurately and squarely positioned and held in place in readiness to be screwed upon the threaded portion of the bonnet of the valve—*i. e.*, the part of the casing through which the valve-stem passes. It is a simple matter to repack and handle the nut when the valve is cold and to position it with the fingers, so that it will turn smoothly onto the thread of the bonnet without crossing or otherwise injuring the threads. Very frequently, however, the packing in the nut has to be removed and the nut repacked when the valve is in use, and if the valve is used for controlling steam or hot water it has always been a very difficult matter, and sometimes almost impossible, to move the nut up to and properly position it on the end of the bonnet and retain it in position to properly engage the thread on the bonnet when the nut, by means of a wrench, is turned thereupon. It will be manifest that when this operation has to be performed against the pressure of a jet of steam or hot water the difficulty and danger is very great, and often the thread on the bonnet or nut, either or both, will be crossed or very seriously injured. My present invention makes it possible to effect the positioning of the nut on the end of the bonnet in readiness to be screwed thereupon with little or no danger to the workman and greatly facilitates the operation, while it absolutely prevents crossing or jamming of the threads.

The various novel features of my invention will be hereinafter described, and particularly pointed out in the following claims.

Figure 1 shows in elevation and partly in section a valve with my novel pliers in use, illustrating the manner of operating the same to place the packing-nut in proper position to be screwed down upon the bonnet; and Fig. 2 is a perspective view of the pliers.

In accordance with my invention the pliers comprise two levers A B, pivoted together at C, the acting ends or jaws A' B' being longitudinally recessed or forked, as at $a^\times b^\times$, to present parallel longitudinal sides and embrace the stem D of the valve, as in Fig. 1, and laterally position the pliers when in use, the inner end of the recess positioning the pliers longitudinally.

The valve-case D', of any well-known construction, the bonnet $D^2$, through which the valve-stem passes and which is externally threaded, as at $d^\times$, and the packing or stuffing nut $D^4$, recessed to receive suitable packing P, Fig. 1, around the valve-stem, are all of usual construction, the nut when screwed down upon the bonnet compressing the packing about the stem and upon the end of the bonnet and maintaining it steam or water tight thereat. The nut itself is loose on the valve-stem, the latter having a suitable hand-wheel $D^3$. In order to screw the nut onto the bonnet, it must be placed square with relation to the end of said bonnet before being turned onto the thread or the latter will be crossed or otherwise injured, and when the parts are cool this setting or positioning of the packing-nut can be readily performed with the fingers. When the valve is in use and the parts are hot and either steam or water pressure is on or when the valve is so located that the nut is hard to get at, repacking becomes a matter of great difficulty, for then the packing-nut cannot be handled and the jet of steam or other fluid from the end of the bonnet acts against the nut to prevent it from being moved up to and positioned squarely on the end of the bonnet in readiness to be screwed thereupon. In order to overcome these obstacles and properly set or position the nut after repacking, I have produced the pliers herein shown, and preferably the outer face of each jaw is concaved in the direction of its length, as at $a\ b$, the curvature corresponding substantially with that of the convex top of the packing-nut.

Referring to Fig. 1 and supposing that the nut $D^4$ has been repacked and is to be screwed down upon the bonnet, the jaws of the pliers are inserted between the top of the nut and the under side of the hand-wheel D³, the forked ends of the jaws embracing the valve-stem and being thereby positioned. The concave face, as $b$, of the jaw adjacent the nut engages the convex top of the latter and on opposite sides of the valve-stem, so that the nut cannot rock or tip in that direction, and the concavity of the jaw-face prevents tilting of the nut in the direction of the length of the jaw. The other jaw, as A', bears against the under side of the hand-wheel, and by bringing the lever-arms A B toward each other the jaws A' B' are separated, the nut D⁴ being moved squarely and powerfully up to the end of the bonnet, and it can be held there as long as desired until, by means of a wrench, the nut can be turned down upon the thread $d^\times$. Manifestly if the nut is held squarely in position when turned to catch the thread on the bonnet there is no chance for crossing or jamming the threads. Even if steam or hot water is escaping or the nut is hard to get at the operator can with comparative ease and with no harm to himself manipulate the nut and get it started fair and true on the bonnet-thread, after which it is a simple matter to screw it on as far as may be necessary.

By concaving both jaws the tool is made reversible, either jaw then presenting a seat for the top of the packing-nut, while the forking of the jaws prevents the pliers from moving sidewise or longitudinally when straddling the valve-stem, as described, and so long as the pliers are held when in use with the bottom of the recess or fork against the stem the nut will be held true and square with relation to the end of the bonnet.

Having described my invention, what I claim, and desire to secure by Letters Patent, is—

1. Pliers of the class described, having pivotally-connected jaws longitudinally recessed or forked to present parallel longitudinal sides, to receive and embrace the stem of a valve, the inner end of the recess coöperating with the stem to longitudinally position the pliers when in use, the outer face of each jaw being longitudinally concaved to correspond to the convex top of a packing-nut and form a seat therefor, and lever-arms connected with and to operate the jaws.

2. Pliers for positioning and holding the packing-nut of a valve squarely upon the bonnet to be screwed thereupon, comprising separable, longitudinally-forked jaws to embrace and be positioned by the valve-stem between the nut and hand-wheel, each jaw having its outer face shaped to form a seat for the nut at each side of the valve-stem and prevent tilting of the nut, and means to separate the jaws, to thereby move the nut to and squarely against the end of the bonnet.

In testimony whereof I have signed my name to this specification in the presence of two subscribing witnesses.

JAMES E. BARNEY.

Witnesses:
   JOHN C. EDWARDS,
   ELIZABETH R. MORRISON.